US008769099B2

(12) United States Patent
Kalaboukis et al.

(10) Patent No.: US 8,769,099 B2
(45) Date of Patent: Jul. 1, 2014

(54) METHODS AND SYSTEMS FOR PRE-CACHING INFORMATION ON A MOBILE COMPUTING DEVICE

(75) Inventors: Chris Kalaboukis, Los Gatos, CA (US); Marc Davis, Berkeley, CA (US); Ron Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 916 days.

(21) Appl. No.: 11/617,451

(22) Filed: Dec. 28, 2006

(65) Prior Publication Data
US 2008/0162686 A1    Jul. 3, 2008

(51) Int. Cl.
*G06F 15/16* (2006.01)
*G06F 15/173* (2006.01)

(52) U.S. Cl.
USPC .......................................... 709/226; 709/203

(58) Field of Classification Search
USPC .................................................. 709/203, 224
See application file for complete search history.

(56) References Cited

U.S. PATENT DOCUMENTS

| 5,446,891 | A | 8/1995 | Kaplan et al. |
| 5,493,692 | A | 2/1996 | Theimer et al. |
| 5,583,763 | A | 12/1996 | Atcheson et al. |
| 5,651,068 | A | 7/1997 | Klemba et al. |
| 5,761,662 | A | 6/1998 | Dasan |
| 5,764,906 | A | 6/1998 | Edelstein et al. |
| 5,781,879 | A | 7/1998 | Arnold et al. |
| 5,784,365 | A | 7/1998 | Ikeda |
| 5,794,210 | A | 8/1998 | Goldhaber et al. |
| 5,802,510 | A | 9/1998 | Jones |
| 5,835,087 | A | 11/1998 | Herz |
| 5,903,848 | A | 5/1999 | Takahashi |
| 5,920,854 | A | 7/1999 | Kirsch et al. |
| 6,014,638 | A | 1/2000 | Burge et al. |
| 6,021,403 | A | 2/2000 | Horvitz et al. |
| 6,047,234 | A | 4/2000 | Cherveny et al. |
| 6,098,065 | A | 8/2000 | Skillen et al. |
| 6,112,181 | A | 8/2000 | Shear et al. |

(Continued)

FOREIGN PATENT DOCUMENTS

| EP | 1362302 | 11/2003 |
| JP | 2002312559 | 10/2002 |

(Continued)

OTHER PUBLICATIONS

Allen James F., "Maintaining Knowledge about Temporal Intervals", *Communications of the ACM*, Nov. 1983, vol. 26, No. 11, pp. 832-843.

(Continued)

*Primary Examiner* — Joshua Joo
(74) *Attorney, Agent, or Firm* — James J. DeCarlo; Greenberg Traurig, LLP

(57) ABSTRACT

Systems and methods for pre-caching information on mobile computing devices. The system and method include, based upon spatial information or temporal information associated with a user of a mobile computing device, detecting the occurrence of a first user event that precedes an associated second user event that will occur at a known time. The method and system further include identifying information corresponding to the associated second user event that will occur at the known time. The method and system also include, in response to detecting the occurrence of the first user event, transmitting to the mobile computing device the information corresponding to the associated second user event that will occur at the known time.

30 Claims, 5 Drawing Sheets

(56) References Cited

U.S. PATENT DOCUMENTS

| | | | |
|---|---|---|---|
| 6,157,924 A | 12/2000 | Austin | |
| 6,169,992 B1 | 1/2001 | Beall et al. | |
| 6,212,552 B1 | 4/2001 | Biliris et al. | |
| 6,266,667 B1 | 7/2001 | Olsson | |
| 6,314,365 B1 | 11/2001 | Smith | |
| 6,314,399 B1 | 11/2001 | Deligne et al. | |
| 6,324,519 B1 | 11/2001 | Eldering | |
| 6,327,590 B1 | 12/2001 | Chidlovskii et al. | |
| 6,446,065 B1 | 9/2002 | Nishioka et al. | |
| 6,490,698 B1 | 12/2002 | Horvitz et al. | |
| 6,502,033 B1 | 12/2002 | Phuyal | |
| 6,523,172 B1 | 2/2003 | Martinez-Guerra et al. | |
| 6,571,279 B1 * | 5/2003 | Herz et al. | 709/217 |
| 6,601,012 B1 | 7/2003 | Horvitz et al. | |
| 6,662,195 B1 | 12/2003 | Langseth et al. | |
| 6,665,640 B1 | 12/2003 | Bennett et al. | |
| 6,694,316 B1 | 2/2004 | Langseth et al. | |
| 6,701,311 B2 | 3/2004 | Biebesheimer et al. | |
| 6,701,315 B1 | 3/2004 | Austin | |
| 6,708,203 B1 | 3/2004 | Maker et al. | |
| 6,731,940 B1 | 5/2004 | Nagendran | |
| 6,741,980 B1 | 5/2004 | Langseth et al. | |
| 6,757,661 B1 | 6/2004 | Blaser et al. | |
| 6,773,344 B1 | 8/2004 | Gabai et al. | |
| 6,781,920 B2 | 8/2004 | Bates et al. | |
| 6,785,670 B1 | 8/2004 | Chiang et al. | |
| 6,789,073 B1 | 9/2004 | Lunenfeld | |
| 6,813,501 B2 | 11/2004 | Kinnunen et al. | |
| 6,816,850 B2 | 11/2004 | Culliss | |
| 6,829,333 B1 | 12/2004 | Frazier | |
| 6,834,195 B2 | 12/2004 | Brandenberg et al. | |
| 6,842,761 B2 | 1/2005 | Diamond et al. | |
| 6,845,370 B2 | 1/2005 | Burkey et al. | |
| 6,850,252 B1 | 2/2005 | Hoffberg | |
| 6,853,913 B2 | 2/2005 | Cherveny et al. | |
| 6,853,982 B2 | 2/2005 | Smith et al. | |
| 6,882,977 B1 | 4/2005 | Miller | |
| 6,892,198 B2 * | 5/2005 | Perisic et al. | 1/1 |
| 6,904,160 B2 | 6/2005 | Burgess | |
| 6,931,254 B1 | 8/2005 | Egner et al. | |
| 6,961,660 B2 | 11/2005 | Underbrink et al. | |
| 6,961,731 B2 | 11/2005 | Holbrook | |
| 6,985,839 B1 | 1/2006 | Motamedi et al. | |
| 7,010,492 B1 | 3/2006 | Bassett et al. | |
| 7,027,801 B1 | 4/2006 | Hall et al. | |
| 7,058,508 B2 | 6/2006 | Combs et al. | |
| 7,058,626 B1 | 6/2006 | Pan et al. | |
| 7,062,510 B1 | 6/2006 | Eldering | |
| 7,065,345 B2 | 6/2006 | Carlton et al. | |
| 7,065,483 B2 | 6/2006 | Decary et al. | |
| 7,069,308 B2 | 6/2006 | Abrams | |
| 7,073,129 B1 | 7/2006 | Robarts et al. | |
| 7,110,776 B2 | 9/2006 | Sambin | |
| 7,143,091 B2 | 11/2006 | Charnock et al. | |
| 7,149,696 B2 | 12/2006 | Shimizu et al. | |
| 7,181,438 B1 | 2/2007 | Szabo | |
| 7,185,286 B2 | 2/2007 | Zondervan | |
| 7,194,512 B1 | 3/2007 | Creemer et al. | |
| 7,203,597 B2 * | 4/2007 | Sato et al. | 701/207 |
| 7,209,915 B1 | 4/2007 | Taboada et al. | |
| 7,219,013 B1 | 5/2007 | Young et al. | |
| 7,236,969 B1 | 6/2007 | Skillen et al. | |
| 7,254,581 B2 | 8/2007 | Johnson et al. | |
| 7,257,570 B2 | 8/2007 | Riise et al. | |
| 7,305,445 B2 | 12/2007 | Singh et al. | |
| 7,320,025 B1 | 1/2008 | Steinberg et al. | |
| 7,343,364 B2 | 3/2008 | Bram et al. | |
| 7,395,507 B2 | 7/2008 | Robarts et al. | |
| 7,404,084 B2 | 7/2008 | Fransdonk | |
| 7,437,312 B2 | 10/2008 | Bhatia et al. | |
| 7,451,102 B2 * | 11/2008 | Nowak | 705/26 |
| 7,461,168 B1 | 12/2008 | Wan | |
| 7,496,548 B1 | 2/2009 | Ershov | |
| 7,522,995 B2 * | 4/2009 | Nortrup | 701/209 |
| 7,529,811 B2 | 5/2009 | Thompson | |
| 7,562,122 B2 | 7/2009 | Oliver et al. | |
| 7,574,115 B2 * | 8/2009 | Schramel | 386/248 |
| 7,577,665 B2 | 8/2009 | Ramer et al. | |
| 7,584,215 B2 | 9/2009 | Saari et al. | |
| 7,624,104 B2 | 11/2009 | Berkhin et al. | |
| 7,624,146 B1 | 11/2009 | Brogne et al. | |
| 7,634,465 B2 | 12/2009 | Sareen et al. | |
| 7,657,907 B2 | 2/2010 | Fennan et al. | |
| 7,681,147 B2 | 3/2010 | Richardson-Bunbury et al. | |
| 7,725,492 B2 | 5/2010 | Sittig et al. | |
| 7,729,901 B2 | 6/2010 | Richardson-Bunbury et al. | |
| 7,769,740 B2 | 8/2010 | Martinez | |
| 7,769,745 B2 | 8/2010 | Naaman | |
| 7,783,622 B1 | 8/2010 | Vandermolen et al. | |
| 7,792,040 B2 | 9/2010 | Nair | |
| 7,802,724 B1 | 9/2010 | Nohr | |
| 7,822,871 B2 | 10/2010 | Stolorz et al. | |
| 7,831,586 B2 | 11/2010 | Reitter et al. | |
| 7,865,308 B2 | 1/2011 | Athsani | |
| 7,925,708 B2 | 4/2011 | Davis | |
| 2001/0013009 A1 | 8/2001 | Greening et al. | |
| 2001/0016489 A1 * | 8/2001 | Haymes et al. | 455/423 |
| 2001/0035880 A1 | 11/2001 | Musatov et al. | |
| 2001/0047384 A1 | 11/2001 | Croy | |
| 2001/0052058 A1 | 12/2001 | Ohran | |
| 2002/0014742 A1 | 2/2002 | Conte et al. | |
| 2002/0019849 A1 | 2/2002 | Tuvey et al. | |
| 2002/0019857 A1 | 2/2002 | Harjanto | |
| 2002/0023091 A1 | 2/2002 | Silberberg et al. | |
| 2002/0023230 A1 | 2/2002 | Bolnick et al. | |
| 2002/0035605 A1 | 3/2002 | McDowell et al. | |
| 2002/0049968 A1 | 4/2002 | Wilson et al. | |
| 2002/0052785 A1 | 5/2002 | Tenenbaum | |
| 2002/0052786 A1 | 5/2002 | Kim et al. | |
| 2002/0054089 A1 | 5/2002 | Nicholas | |
| 2002/0065844 A1 | 5/2002 | Robinson et al. | |
| 2002/0069218 A1 | 6/2002 | Sull et al. | |
| 2002/0099695 A1 | 7/2002 | Abajian et al. | |
| 2002/0103870 A1 | 8/2002 | Shouji | |
| 2002/0111956 A1 | 8/2002 | Yeo et al. | |
| 2002/0112035 A1 | 8/2002 | Carey | |
| 2002/0133400 A1 | 9/2002 | Terry et al. | |
| 2002/0138331 A1 | 9/2002 | Hosea et al. | |
| 2002/0152267 A1 | 10/2002 | Lennon | |
| 2002/0169840 A1 | 11/2002 | Sheldon et al. | |
| 2002/0173971 A1 | 11/2002 | Stirpe et al. | |
| 2002/0178161 A1 | 11/2002 | Brezin et al. | |
| 2002/0198786 A1 | 12/2002 | Tripp et al. | |
| 2003/0008661 A1 | 1/2003 | Joyce et al. | |
| 2003/0009367 A1 | 1/2003 | Morrison | |
| 2003/0009495 A1 | 1/2003 | Adjaoute | |
| 2003/0027558 A1 | 2/2003 | Eisinger | |
| 2003/0032409 A1 | 2/2003 | Hutcheson et al. | |
| 2003/0033331 A1 | 2/2003 | Sena et al. | |
| 2003/0033394 A1 | 2/2003 | Stine | |
| 2003/0065762 A1 | 4/2003 | Stolorz et al. | |
| 2003/0069877 A1 | 4/2003 | Grefenstette et al. | |
| 2003/0069880 A1 | 4/2003 | Harrison et al. | |
| 2003/0078978 A1 | 4/2003 | Lardin et al. | |
| 2003/0080992 A1 | 5/2003 | Haines | |
| 2003/0084098 A1 * | 5/2003 | Lavin et al. | 709/203 |
| 2003/0126250 A1 | 7/2003 | Jhanji | |
| 2003/0149574 A1 | 8/2003 | Rudman | |
| 2003/0152067 A1 * | 8/2003 | Richmond et al. | 370/352 |
| 2003/0154293 A1 | 8/2003 | Zmolek | |
| 2003/0165241 A1 | 9/2003 | Fransdonk | |
| 2003/0191816 A1 | 10/2003 | Landress et al. | |
| 2004/0010492 A1 | 1/2004 | Zhao et al. | |
| 2004/0015588 A1 | 1/2004 | Cotte | |
| 2004/0030798 A1 | 2/2004 | Andersson et al. | |
| 2004/0034752 A1 | 2/2004 | Ohran | |
| 2004/0043758 A1 | 3/2004 | Sorvari et al. | |
| 2004/0044736 A1 | 3/2004 | Austin-Lane et al. | |
| 2004/0070602 A1 | 4/2004 | Kobuya et al. | |
| 2004/0111476 A1 * | 6/2004 | Trossen et al. | 709/206 |
| 2004/0132467 A1 * | 7/2004 | Hull et al. | 455/458 |
| 2004/0139025 A1 | 7/2004 | Coleman | |

(56) References Cited

U.S. PATENT DOCUMENTS

| | | |
|---|---|---|
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1* | 7/2005 | Hahn-Carlson ............... 705/67 |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell et al. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Ameerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0149214 A1* | 6/2007 | Walsh et al. ............... 455/456.1 |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1* | 9/2007 | Brasche et al. ............... 701/207 |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |

(56) References Cited

U.S. PATENT DOCUMENTS

| | | | |
|---|---|---|---|
| 2008/0148175 A1 | 6/2008 | Naaman et al. | |
| 2008/0154720 A1 | 6/2008 | Gounares | |
| 2008/0163284 A1 | 7/2008 | Martinez et al. | |
| 2008/0172632 A1 | 7/2008 | Stambaugh | |
| 2008/0177706 A1 | 7/2008 | Yuen | |
| 2008/0270579 A1* | 10/2008 | Herz et al. .................. | 709/219 |
| 2008/0285886 A1 | 11/2008 | Allen | |
| 2008/0301250 A1 | 12/2008 | Hardy et al. | |
| 2008/0320001 A1 | 12/2008 | Gaddam | |
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |
| 2011/0299494 A1* | 12/2011 | Casey et al. .................. | 370/329 |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 A | 5/2006 |
| KR | 102007034094 | 3/2007 |
| KR | 1020070073180 A | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

MediaFlo™, "FLO™ Technology Overview", Qualcomm Inc., Copyright 2007, (pp. 1-24 of attached).

Press Release, "QUALCOMM Conducts First Live Demonstration of FL Technology on a Wireless Handset", Qualcomm Inc., San Diego, Sep. 27, 2005, (pp. 1-3 of attached).

U.S. Appl. No. 12/409,867, filed Mar. 24, 2009, King.

U.S. Appl. No. 12/540,098, filed Aug. 12, 2009, Martinez.

U.S. Appl. No. 12/536,892, filed Aug. 6, 2009, King.

U.S. Appl. No. 12/540,588, filed Aug. 13, 2009, Tendjoukian.

U.S. Appl. No. 12/015,115, filed Jan. 16, 2006, Higgins.

U.S. Appl. No. 12/180,486, filed Jul. 25, 2008, Higgins.

U.S. Appl. No. 12/180,499, filed Jul. 25, 2008, Higgins.

U.S. Appl. No. 12/015,146, filed Jan. 16, 2008, Higgins.

U.S. Appl. No. 12/041,088 filed Mar. 3, 2008, Higgins.

U.S. Appl. No. 12/041,062, filed Mar. 3, 2008, Higgins.

U.S. Appl. No. 12/041,054, filed Mar. 3, 2008, Higgins.

U.S. Appl. No. 12/540,269, filed Aug. 12, 2009, Kalaboukis.

U.S. Appl. No. 11/969,815, filed Jan. 4, 2004, Davis.

U.S. Appl. No. 12/182,111, filed Jul. 29, 2008, Davis.

U.S. Appl. No. 12/434,575, filed May. 1, 2009, O'Sullivan.

U.S. Appl. No. 12/434,580, filed May. 1, 2009, O'Sullivan.

U.S. Appl. No. 12/407,690, filed Mar. 19, 2009, Davis.

U.S. Appl. No. 12/407,681, filed Mar. 19, 2009, Athsani.

International Search Report (PCT/US2009/030405) dated Sep. 23, 2009; 2 pages.

U.S. Appl. No. 12/041,054 file history dated Mar. 3, 2008; 64 pgs.

U.S. Appl. No. 12/041,062 file history dated Mar. 3, 2008; 66 pgs.

U.S. Appl. No. 12/041,088 file history dated Mar. 3, 2008; 66 pgs.

U.S. Appl. No. 12/169,931 file history dated Jul. 9, 2008; 66 pgs.

U.S. Appl. No. 12/170,025 file history dated Jul. 9, 2008; 67 pgs.

U.S. Appl. No. 12/180,499 file history dated Jul. 25, 2008; 67 pgs.

U.S. Appl. No. 12/180,486 file history dated Jul. 25, 2008; 65 pgs.

International Search Report PCT/US2009/030406 dated Sep. 29, 2009; 5 pages.

International Search Report and Written Opinion PCT/US2009/034445 dated Oct. 12, 2009; 7 pages.

Office Action U.S. Appl. No. 12/041,054 dated Oct. 27, 2010; 15 pages.

Office Action U.S. Appl. No. 12/041,062 dated Oct. 28, 2010; 12 pages.

International Search Report PCT/US2009/034444 dated Sep. 18, 2009; 2 pages.

Office Action U.S. Appl. No. 12/041,088 dated Oct. 4, 2010; 18 pages.

Axup, Jeff et al., "Conceptualizing New Mobile Devices by Observing Gossip and Social Network Formation Amongst the Extremely Mobile", ITEE Technical Report #459, Dec. 19, 2005, pp. 1-71.

"Digital rights management: a primer: developing a user-friendly means of protecting content.(Profile)", Screen Digest, No. 420, p.; 305, Sep. 2006.

Nedos, A; Singh K., Clarke S, "Proximity Based Group Communications for Mobile Ad Hoc Networks", Proximity-Based Group Communication; Global Smart Spaces; D.14; Oct. 3, 2003; 31 pages.

Brunato, M; Battiti R. "Pilgrim: A Location Broker and Mobility-Aware Recommendation System"; Technical report DIT-02-0092, Universita di Trento, Oct. 2002; 8 pages.

Backstrom et al., Spatial Variation in Search Engine Queries, WWW•2008, Beijing, China (Apr. 21-25, 2008).

Gan et al., Analysis of Geographic Queries in a Search Engine Log, LocWeb 2008, Beijing, China (Apr. 22, 2008).

Jones et al., Geographic Intention and Modification in Web Search, International Journal of Geographical Information Science, vol. 22, No. 3, pp. 1-20 (Jul. 2008).

Sanderson et al., Analyzing Geographic Queries; Department of Information Studies; University of Sheffield, UK; 2 pages.

Go With the Flow, The Economist Technology Quarterly, vol. 382, Issue 8519, 4 pages, (Mar. 10, 2007).

International Search Report and Written Opinion (PCT/US2009/060476) dated May 4, 2010; 12 pages.

International Search Report and Written Opinion (PCT/US2009/060374) dated Apr. 30, 2010; 12 pages.

(56) References Cited

OTHER PUBLICATIONS

International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454 filed Dec. 10, 2007, Davis.
U.S. Appl. No. 11/953,494, filed Dec. 10, 2007, Davis.
U.S. Appl. No. 11/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,345, filed Nov. 18, 2008, Nair.
U.S. Appl. No. 12/241,198, filed Sep. 30, 2008, Higgins.
U.S. Appl. No. 12/273,259, filed Nov. 18, 2008, Martinez.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/273,371, filed Nov. 18, 2008, Nair.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: the Concept Revisited," WWW/O, Hong Kong, May 2-5, 2001, pp. 406-414.

Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N. S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/course/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.

(56) References Cited

OTHER PUBLICATIONS

Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
"Google Earth User Guide—Using Image Overlays and 3D Models", 9 pgs <<http://earth.google.com/userguide/v4/ug_imageoverlays.html>> Retrieved on Feb. 27, 2008.
O'Hare et al., "Combination of Content Analysis and Context Features for Digital Photograph Retrieval", Integration of Knowledge, Semantics and Digital Media Technology, 2005. EWIMT 2005; Nov. 30 2005-Dec. 1, 2005, pp. 323-328.
Davis et al., "From Context to Content: Leveraging Context for Mobile Media Metadata", 2004, pp. 188-195.
Davis et al., "Using Context and Similarity for Face and Location Identification", In Proceedings of the IS&T/SPIE 18th Annual Symposium on Electronic Imaging Science and Technology, 2006, 9 pgs.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 11/593,869, filed Nov. 6, 2006, Naaman.
U.S. Appl. No. 11/237,709, filed Sep. 25, 2008, Martinez.
U.S. Appl. No. 11/353,657, filed Feb. 13, 2008, Naaman.
U.S. Appl. No. 11/437,344, filed May 19, 2006, Jaffe.
U.S. Appl. No. 12/273,317, filed Nov. 18, 2008, Rahul Nair.
U.S. Appl. No. 11/593,668, filed Nov. 6, 2006, Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology On a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices By Observing Gossip and Social Network Formation Amongst the Extrmely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005.
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49.
Konomi, Shin'ichi et al., "Supporting Colocated Interactions Using RFID and Social Network Displays", Pervasive Computing, Jul.-Sep. 2006 , vol. 5, No. 3, pp. 48-56.
Lin, F. et al., "A unified framework for managing Web-based services. ", Information Systems and e-Business Management, vol. 3, Oct. 2005, p. 299.
Metz, Cade, "MySpace Nation", PC Magazine, Jun. 21, 2006.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44.
Voight, Joan et al., "Lessons for Today's Digital Market", Adweekcom, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content. (Profile)", Screen Digest, No. 420, p. 305, Sep. 2006.
"Emerging Markets: What media 2.0 can offer advertisers.", Campaign, Oct. 27, 2006, p. 26.
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode—URL Barcodes—practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Flickr. "Welcome to Flickr—Photo Sharing," located at <http://www.flickr.com> visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu.acil/Personal_sites/tamirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.

(56) References Cited

OTHER PUBLICATIONS

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In On the Move to Meaningful Internet Systems 2003: Coop/S, DOA, and ODBASE R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo LO1: Browsing Multi-User Photo Collections," MM'05 Singapore, pp. 223-224.

Pigeau, A. et al. (Jun. 17, 2005). "Organizing a Personal Image Collection with Statistical Model-Based ICL Clustering on Spatio-Temporal Camera Phone Meta-Data." 25 pages.

Sarvas, R. et al. (Jun. 6-9, 2004). "Metadata Creation System for Mobile Images," MobiSys'04 Boiton, Massachusetts, pp. 36-48.

Toyama, K. et al." (Nov. 2-8, 2003). "Geographic Location Tags on Digital Images," MM '03'Berkeley: California. 12 pages.

\* cited by examiner

METHODS AND SYSTEMS FOR PRE-CACHING INFORMATION ON A MOBILE COMPUTING DEVICE

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

Increasingly, users of mobile computing devices are requiring greater and more frequent access to information located at remote computing devices. For example, users are increasingly retrieving information that corresponds to certain events, times and/or locations. Information such as Internet content, advertisements, and application data (e.g., traffic congestion or weather data) are but a few of many example of the information that is regularly sent to users of mobile computing devices. However, despite an increasing demand for information at mobile computing devices, the bandwidth for transmitting information to mobile computing devices and the storage capacity at mobile computing devices often lag behind or are insufficient to meet the increasing user demands. Furthermore, the growth of mobile devices as a real-time marketing and transaction channel creates an even greater need for having the most relevant information available on a mobile device at a needed time and place without delay. Thus, there exists a need for methods and systems to intelligently transmit to and store information on mobile computing devices.

SUMMARY

Against this backdrop systems and methods have been developed for pre-caching information on mobile computing devices. In one example (which example is intended to be illustrative and not restrictive), the present invention may be considered a method for pre-caching information. The method includes, based upon spatial information or temporal information associated with a user of a mobile computing device, detecting the occurrence of a first user event that precedes an associated second user event that will occur at a known time. The method further includes identifying information corresponding to the associated second user event that will occur at the known time. The method also includes, in response to detecting the occurrence of the first user event, transmitting to the mobile computing device the information corresponding to the associated second user event that will occur at the known time.

In another example (which example is intended to be illustrative and not restrictive), the present invention may be considered a method for pre-caching information. The method includes, based upon spatial information or temporal information associated with a user of a mobile computing device, detecting the occurrence of a first user event that precedes an associated second user event that may occur after the first user event. The method further includes identifying information corresponding to the associated second user event that may occur after the first event. The method also includes, in response to detecting the occurrence of the first user event, transmitting to the mobile computing device the information corresponding to the associated second user event that may occur after the first user event.

In yet another example (which example is intended to be illustrative and not restrictive), the present invention may be considered a system for delivering information prior to a user event. The system includes a user event module, in communication with a remote computing device, wherein the user event module maintains user events associated with at least one user of at least one mobile computing device. The system further includes an event information module, in communication with a remote computing device, wherein the event information module maintains information corresponding to events associated with the at least one user of the at least one mobile computing device. The system also includes a management module, on the remote computing device, wherein the management module detects a first user event and identifies information corresponding to a second user event associated with the first user event. The system further includes a communications module, in communication with the management module, wherein the communications module is adapted to transmit, prior to a known or probable occurrence of the second user event, the information corresponding to the second user event to the at least one mobile computing device in communication with the remote computing device via a communications network.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
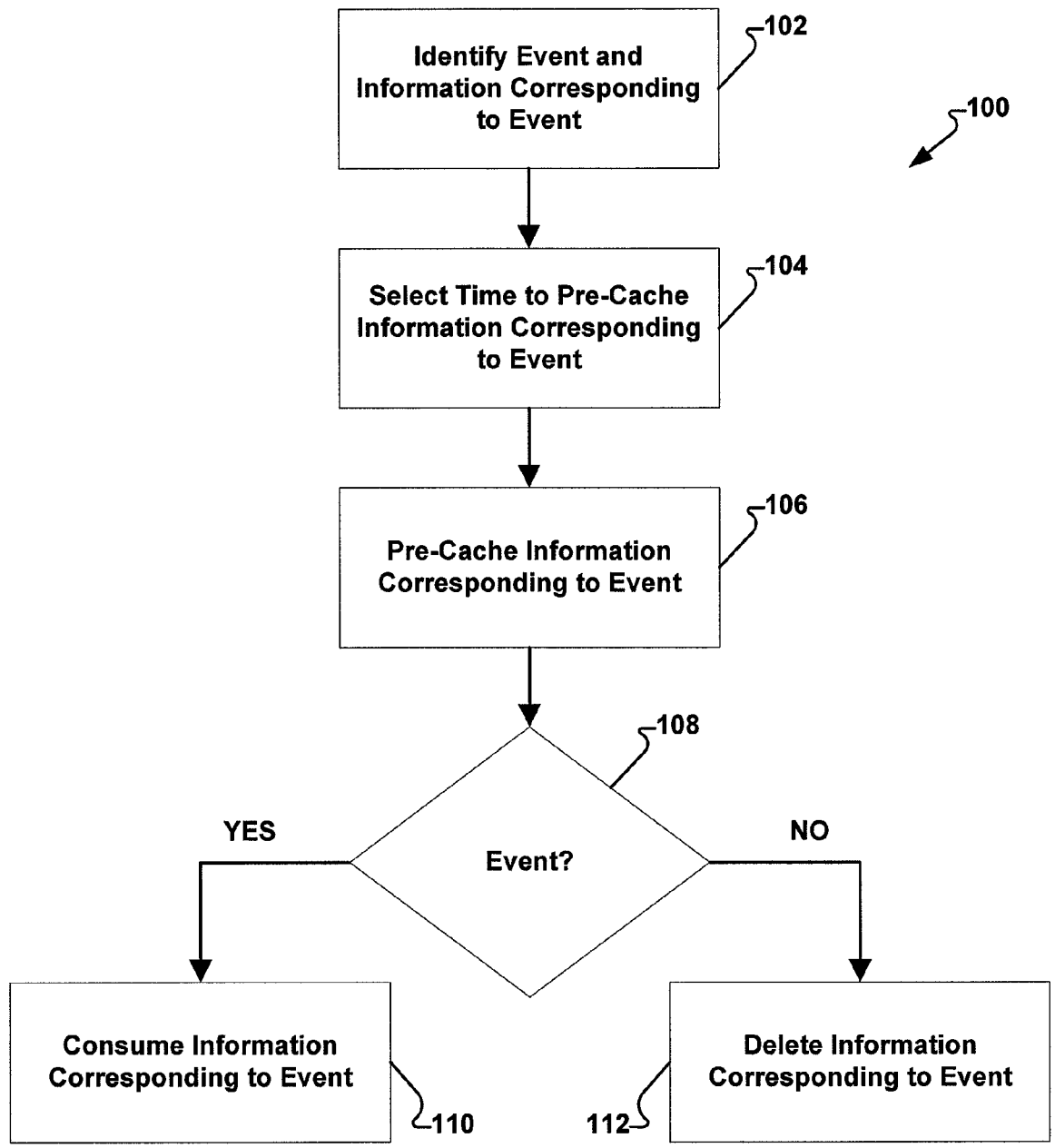
FIG. 1 is a schematic view illustrating a high-level embodiment of a high-level method for pre-caching information on a mobile computing device.

FIG. 1 is a schematic view illustrating a high-level embodiment of a high-level method 100 for pre-caching information on a mobile computing device. In the method 100, an event and information corresponding to an event are identified in an identifying operation 102. As used within this disclosure, the associated figures and the appended claims, an "event" is used to generally describe something that happens at a place and/or time. One skilled in the art will recognize that events may take many forms, including but not limited to an occurrence, often generated by a user, to which a computer might respond (e.g., a key press), a processing event, a calendar event, and events based upon a change in the location of a thing or based upon a change in time. In one embodiment of identifying operation 102, an event may be comprised of a spatial or temporal event, such as a location or time. For example, a mobile computing device may report its location (e.g., the "Eiffel Tower" or geographic coordinates) or a time (e.g., the notification of a calendar entry having a beginning time or end time may represent the event). As another example, a scheduled data transmission may comprise an event. In one embodiment of an identifying operation 102, the information corresponding to the event may be comprised of spatial information. For example, the event may be comprised of the location (e.g., geographic coordinates or a network location) of a mobile computing device or a location corresponding to an appointment scheduled on a user's calendar (e.g., the place where the appointment takes place). In another embodiment of an identifying operation 102, the information corresponding to the event may be comprised of temporal information. For example, the information corresponding to an event may include a time or a duration of time.

The method 100 further comprises selecting a time to pre-cache information corresponding to an event in selection operation 104. In one embodiment, the time selected precedes the event such that the information corresponding to the event may be pre-cached or stored prior to an occurrence of the event. For example, where an event comprises a calendar entry location (e.g., identifying the location of a dinner reservation in a user's calendar), the information corresponding to the event (e.g., a coupon for the restaurant) may be stored prior to a user reaching the location or the time of the calendar entry.

In a further embodiment, the amount of time preceding an event may correspond to the size of the information corresponding to the event that will be sent before the occurrence of the event. For example, where an event occurs in five minutes, the information corresponding to the event may be reduced or chosen such a way as to ensure delivery prior to the event. Following this example, where there is more than one type of information to send to a mobile computing device (e.g., a low-resolution image and a high-resolution image), it may be easier to send the less resource-intensive information where the event may occur before the high resource-intensive information could be received. In another embodiment, the amount of time preceding an event may correspond to the bandwidth or transmission capacity that is available to deliver information corresponding to an event to a mobile computing device. Following the previous example, it may be preferable to send less resource-intensive information (e.g., a low-resolution image) where the transmission capacity for sending information to a mobile computing device is limited. In yet another embodiment, the information corresponding to an event may be prioritized such that the information is transmitted to a mobile device according to its priority. For example, where there exists very little time before the occurrence of an event, it may be more efficient to transfer information corresponding to priority such that information having a higher priority is transferred before information having a lower priority.

The method 100 further comprises pre-caching information corresponding to the event in a pre-caching operation 106. In one embodiment, a pre-caching operation 106 may involve transmitting information and/or saving information. In one embodiment, a pre-caching operation 106 may store information on a storage device, including but not limited to volatile memory (e.g., RAM), associated with a mobile computing device. By way of illustration, a pre-caching operation 106 may involve the steps of retrieving information corresponding to an event, transmitting the retrieved information to a mobile computing device and storing the information in memory or some other storage device associated with the mobile computing device.

In a decision operation 108, the method 100 further comprises deciding whether an identified event occurred. For example, deciding operation 108 may comprise deciding whether a user's mobile computing device reported that the user entered a certain location corresponding to an identified event. If, as is set forth in consuming operation 110, the event is determined to have occurred, the information corresponding to the event may be consumed in a consuming operation 110. For example, where the information corresponding to the event comprises one or more images, the information may be displayed. Similarly, where the information corresponding to the event comprises audio information, the information may played through a speaker. Alternatively, in a deleting operation 112, if the event was determined not to have occurred, the information corresponding to the event may be deleted. For example, if the event is determined not to have occurred, the information corresponding to the event may gradually or instantaneously be removed from a storage device. As another example, where an event is determined to not have occurred, the information corresponding to an event may be replaced or deleted when new information is received at the mobile computing device. As yet another example, where an event is determined to not have occurred, the information corresponding to an event may trigger yet another event and/or the transmission of information. One skilled in the art will recognize that deleting events may take many forms that are within the scope of this disclosure. For example, by way of illustration and not of limitation, the deletion of an event may occur in response to receiving a meeting cancellation notice.

Figure 2:
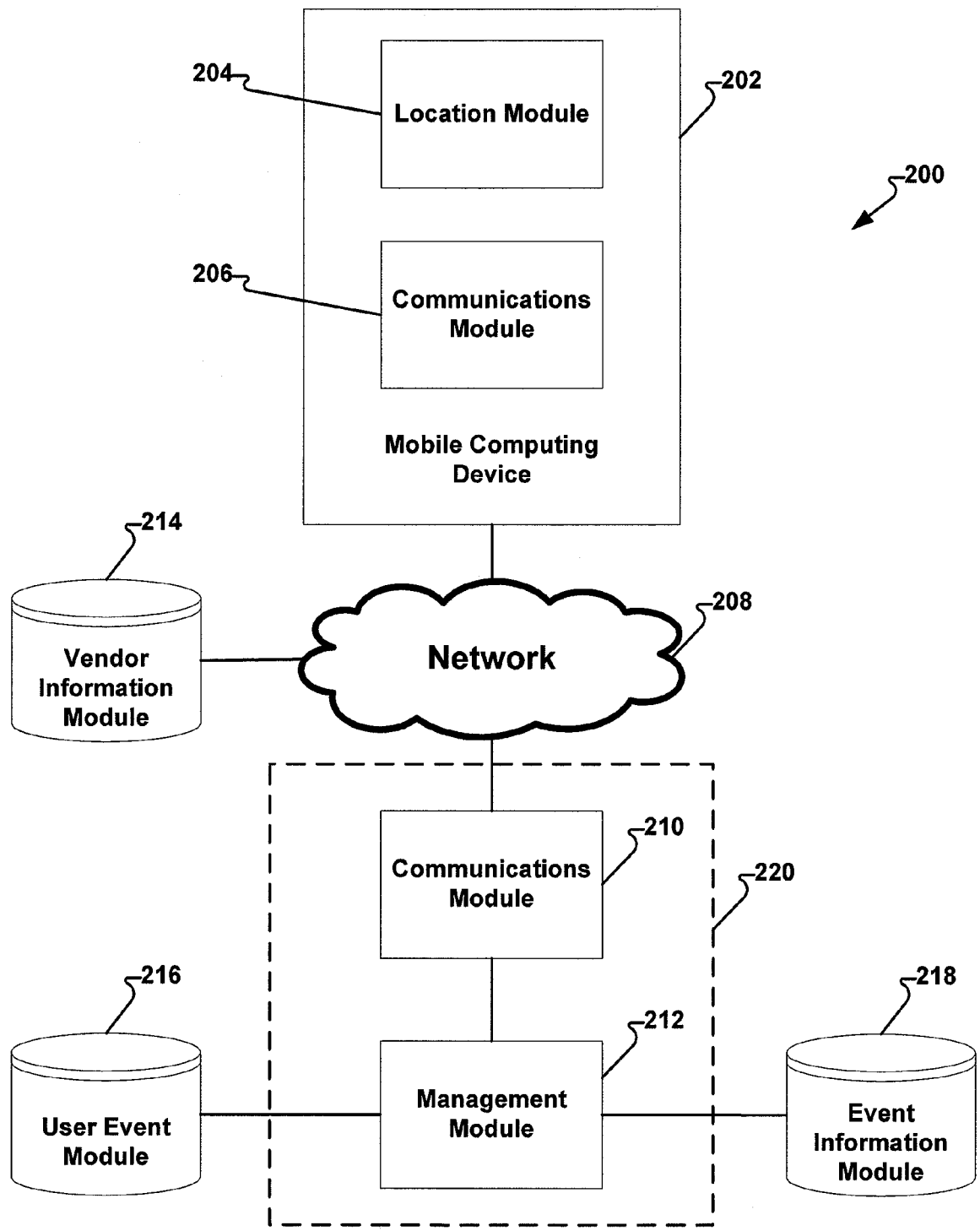
FIG. 2 is a schematic view illustrating one embodiment of a system for delivering information prior to a user event.

FIG. 2 is a schematic view illustrating one embodiment of a system 200 for delivering information prior to a user event. In one embodiment, the system 200 is comprised of a mobile computing device 202. One skilled in the art will recognize that a mobile computing device 202 may take many forms, including but not limited to computing devices that may utilize a battery for power. In one embodiment, a mobile computing device 202 may comprise a cell phone, a personal digital assistant, a mobile data terminal, a notebook computer or similar device. In another embodiment, a mobile computing device 202 may comprise a portable and/or wirelessly connected computing device. As set forth in the illustration of system 200 in FIG. 2, a mobile computing device 202 may further be comprised of a location module 204 and a communications module 206. In one embodiment, a mobile computing device may be comprised of a location module 204 that itself, among other things, may determine spatial (i.e., location) information or receives spatial information. For example, a location module 204 may be comprised of one or more components that may utilize the Global Positioning System ("GPS") to determine a location of a mobile computing device 202. As another example, a location module 204 may identify a network location for the mobile computing device 202 by utilizing information transmitted to and/or from a communications network including but not limited to a cellular (GPRS), Bluetooth, radio, satellite or wireline communications network 208. In one embodiment, a mobile computing device 202 also comprises a communications module 206. A communications module 206 may be comprised of one or more components that permit communication between a mobile communications device 202 and a communications network 208. In one embodiment, one or more components comprising a communications module 208 may be integrated with or comprise the same one or more components of a location module 204.

In one embodiment, the system 200 is further comprised of a remote computing device 220. In one embodiment, a remote computing device 220 may be comprised of one or more than one computing device. In one embodiment, a remote computing device 220 may include a communications module 210. A communications module 210 may be comprised of one or more components that permit communication between a remote computing device 220 and a communications network 208. In another embodiment, a communications module 210 may be adapted to transmit, prior to a known or probable occurrence of the second user event, information corresponding to a second user event to at least one mobile computing device 202 in communication with a remote computing device 220 via a communications network 210.

In one embodiment, a system 200 is further comprised of a management module 212. In one embodiment, a management module 212 may detect a first user event maintained within a user event module 216 that maintains user events associated with at least one user of at least one mobile computing device 202. For example, where a user event module 216 comprises one or more computers and/or storage devices, a management module 212 of a remote computing device 220 may search user event records stored within the user event module 216 for a record corresponding to a mobile computing device 220. In one embodiment, a management module 212 of remote computing device 220 may also identify information corresponding to a second user event associated with the first user event. For example, a management module 212 may be connected to an event information module 218 that stores information corresponding to user events. In this example, a management module 212 may search for information matching or otherwise related to a user event maintained in a user event module 216. In one embodiment, the event information module 218 maintains information corresponding to events associated with the at least one user of the at least one mobile computing device 202.

In another embodiment, a system 200 may be further comprised of a vendor information module 214 that maintains vendor information that may correspond to a user event, for example, as may be stored in a user event module 216.

Figure 3:
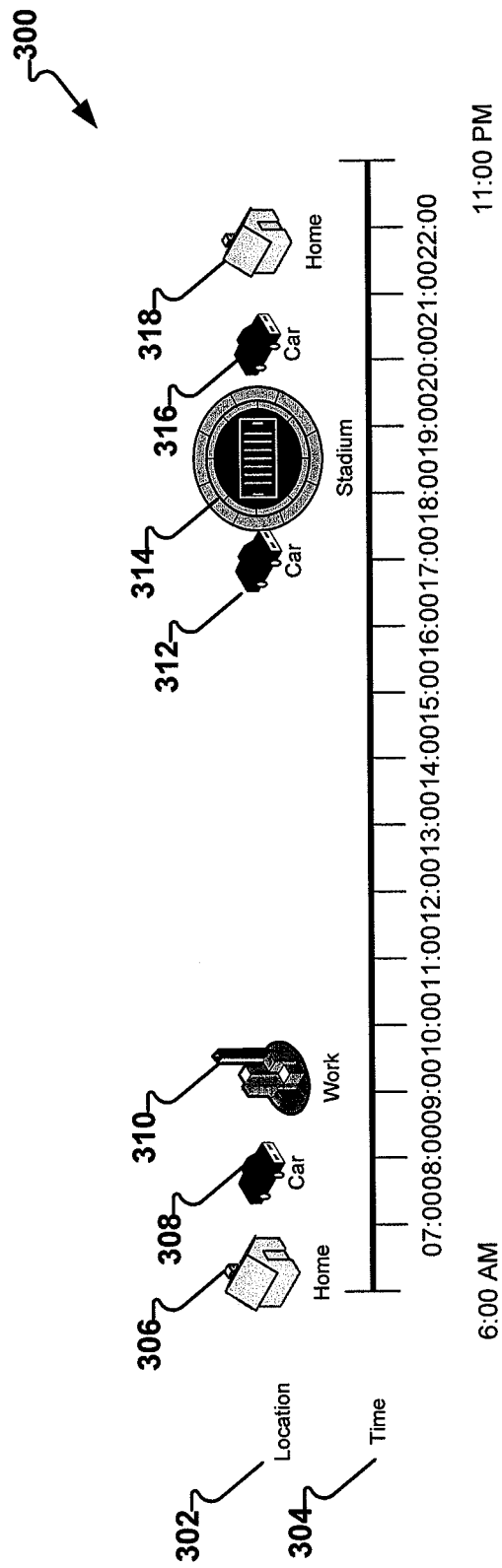
FIG. 3 is a schematic view illustrating an event timeline corresponding to one embodiment of a method for pre-caching information on a mobile computing device.

FIG. 3 is a schematic view illustrating an event timeline 300 corresponding to one embodiment of a method for pre-caching information on a mobile computing device. As illustrated in FIG. 3, the events comprising an event timeline 300 may be comprised of spatial events, such as events occurring at a location 302, and temporal events, such as events occurring at a time 304. For example, and as illustrated in FIG. 3, events may include an event with a beginning and ending time, such as an arrival at home event 318 and departure from home event 306. As another example, and as further illustrated in FIG. 3, events may include events with a duration such as driving events 308, 312, 316, a work event 310 or a stadium event 314. In one embodiment, events may be of a known duration, such as a work event 310 that may last for a known time period such as from 9 A.M. to 5 P.M. In another embodiment, events may be of an uncertain or probable duration, such as a stadium event 314 that may last for an unknown duration but nonetheless (e.g., in the case of an NBA basketball game) is unlikely to last beyond a certain duration (e.g., three or four hours).

In one embodiment of an event timeline 300 corresponding to an embodiment of a method for pre-caching information on a mobile computing device, information comprising traffic conditions corresponding to a driving event 308, 312, 316 (e.g., an associated second user event) may be transmitted to a mobile computing device during the occurrence of an arrival at home event 318, departure from home event 306, work event 310 and/or a stadium event 314 (e.g., each, respectively, may be considered a first user event to a following event in an event timeline 300). In one embodiment, information corresponding to more than one associated second user event may be delivered at one time. For example, prior to a second user event (e.g., a stadium event 314), information for a driving event 312 (e.g., directions to the stadium) and a stadium event 314 (e.g., one or more vendor coupons from food and/or beverage vendors at the stadium) may be transmitted to a mobile computing device upon the occurrence of a first user event such as driving event 308 or work event 310. Temporal events may thus be represented numerically or semantically so as to afford calculations of absolute temporal relations, constrained temporal relations, or relative temporal relations. Temporal relations are discussed generally in Allen, J. F., Maintaining Knowledge about Temporal Intervals, Communications of the ACM 26, 11, 832-843 (November 1983) (see http://www.cs.rochester.edu/u/james/), which is hereby incorporated herein by reference as if it were set forth in its entirety. For example, temporal events may be expressed as numeric values (e.g., a certain number of minutes, seconds or hours between a start time and an end time) which may be absolute, probabilistic, partly indeterminate, variable, or constrained. As another example, temporal events may be expressed as relative symbolic values (e.g., a temporal event may be before, after, adjacent to, overlap with, start with, finish with, contain, be contained by, or equal another temporal event) which may be absolute, probabilistic, partly indeterminate, variable, or constrained. As yet another example, temporal events may be expressed as semantic values (e.g., an absolute or relative time that may depend upon a contextual condition, such as geography). By way of illustration, and not of limitation, such semantic values might include a relative time (e.g., "sunset" or "winter") that may change or result in a different numeric time depending upon a geographic location (e.g., "sunset" varies both by different time zones and different latitudes, and "winter" is temporally inverted depending on southern versus northern hemisphere). In addition, temporal events may have periodic recurrence patterns (both regular and irregular periodic recurrence patterns) that determine their similarity and relevant sequencing. By way of illustration, and not of limitation, such relative values might include a holiday (e.g., "Christmas" or "Passover"), a day of a week (e.g., "Tuesday"), a month (e.g., "January"), a life event (e.g., "a birthday" or "an anniversary"), or a recurring appointment (e.g., "weekly status meeting").

One skilled in the art will recognize that a multitude of event combinations and permutations are possible and within the scope of this disclosure. One skilled in the art will also recognize that the character, type, and quantity of information delivered and transmission methods for transmitting information to a mobile computing device are numerous and also within the scope of this disclosure.

Figure 4:
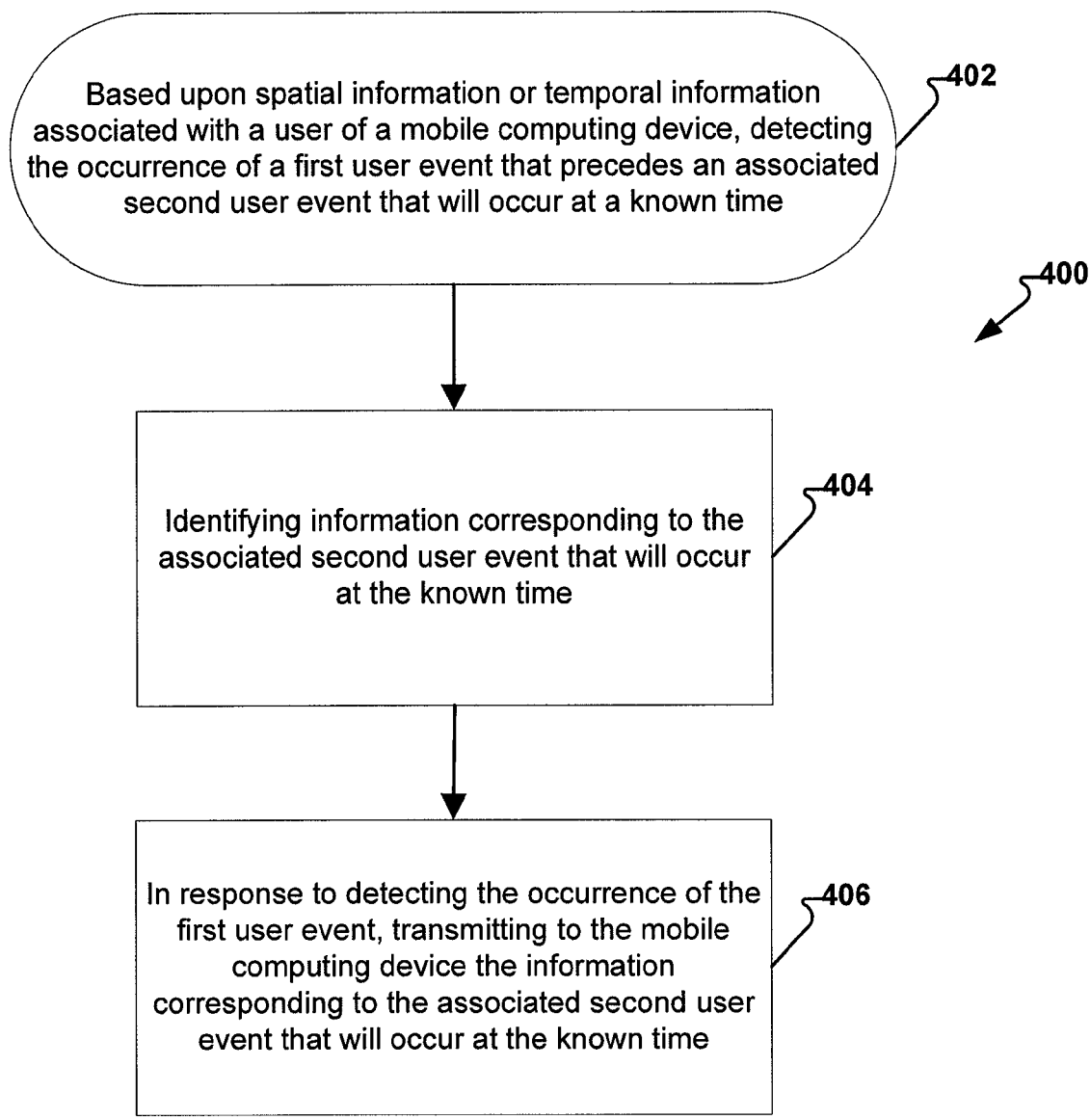
FIG. 4 is a schematic illustrating one embodiment of a method for pre-caching information on a mobile computing device.

FIG. 4 is a schematic illustrating one embodiment of a method 400 for pre-caching information on a mobile computing device. In one embodiment, a method 400 includes, based upon spatial information or temporal information, detecting the occurrence of a first user event that precedes an associated second user event that will occur at a known time in a detecting operation 402. In one embodiment of detecting operation 402, the spatial or temporal information may be associated with a user of a mobile computing device. In one embodiment of detecting operation 402, the spatial information or the temporal information may itself correspond to the first user event. For example, the detection of a first user event in detecting operation 402 may comprise detecting the movement of a mobile computing device to a certain location or from one location to another location. As another example, the detection of a first user event in detecting operation 402 may comprise detecting a time of an event occurring on a mobile computing device. As yet another example, the detection of a first user event in detecting operation 402 may comprise detecting a location that corresponds to an event associated with the user of a mobile computing device. Following this example, a first location associated with a user's calendar entry may be detected such that the first location may precede a second calendar entry associated with a second location.

In one embodiment of detecting operation 402, a first user event may be detected based upon measurement of one or more spatial information values. In one embodiment of method 400, spatial information associated with a user of the mobile computing device may comprises at least one of global positioning system data, Bluetooth data, cellular network data, wireless network data, and wireline network data. For example, spatial information may include information that indicates the physical or geographic location of a mobile computing device. As another example, spatial information may include information that indicates the network location of a mobile computing device, including but not limited to the inclusion within a certain subset of network devices (e.g., a mobile computing device may be associated with a certain service tier that permits display of information corresponding with certain events to the mobile computing device). In another embodiment of detecting operation 402, a first user event may be detected by measuring a spatial information value such as an average or instantaneous speed, an average velocity or instantaneous velocity, a heading or direction of motion, or location data.

In another embodiment of detecting operation 402, a first user event may be detected based upon measurement of one or more temporal information values. In one embodiment, temporal data may comprise a time or duration. For example, a time may be associated with a user event, including but not limited to the beginning time or ending time of a calendar appointment. As another example, a first user event may be detected based upon measurement of a duration of an event. For example, the occurrence of a first user event may be detected upon the first event occurring for a certain or minimum duration such that an associated second user event may occur at a known time following a prior event of a certain duration.

In one embodiment, detecting operation 402 further comprises detecting a unique identifier corresponding to the user of the mobile computing device. In another embodiment, detecting operation 402 may comprise detecting the consumption of information corresponding to the first user event where the information corresponding to the first user event is associated with the user of the mobile computing device. For example, where the first user event comprises displaying a video file of a certain duration or having a certain beginning or ending time, the end of display may itself be detected. In yet another embodiment, a first user event of detecting operation 402 may be associated with another user of another mobile computing device. For example, the presence or absence of another user may result in different information being transmitted to a user's mobile computing device. Following this example, if a user of a mobile computing device has one friend who likes opera and another friend who likes football, the information (e.g., opera history or football scores) transmitted to the user's mobile computing device may depend upon whether the opera-loving friend or football-loving friend is present. In still yet another embodiment, detecting the occurrence of a first user event may further comprise aggregating user event information from a plurality of mobile computing device users. For example, pre-caching may be aided by aggregating and anonymizing user data (e.g., opera lovers, in aggregate, may tend to purchase cough drops prior to an opera).

In one embodiment, a method 400 then includes identifying information corresponding to the associated second user event that will occur at the known time in an identifying information operation 404. One skilled in the art will recognize that the information corresponding to an associated second user event in an identifying information operation 404 may take many forms that are within the scope of this disclosure. For example, where a location (e.g., driving in the direction of work) is detected as the first user event, information may correspond to an associated second user event (e.g., where work comprises the associated second user event, information may be comprised of calendar appointments for work). As another example, where temporal information (e.g., a time coinciding with a user's work hours) is detected as the first user event, information may correspond to an associated second user event (e.g., where a dinner appointment comprises the associated second user event, the information may be comprised of directions to dinner). In one embodiment, an identifying information operation 404 comprises identifying at least one database record associated with a unique identifier corresponding to a user of a mobile computing device where the at least one database record contains information corresponding to an associated second user event that will occur at a known time. In another embodiment, an identifying information operation 404 may comprise identifying information from one or more vendors. In yet another embodiment, an identifying information operation 404 may identifying information from a past user event corresponding to an associated second user event that will occur at a known time.

In one embodiment, a method 400 further includes, in response to detecting the occurrence of the first user event, transmitting to a mobile computing device information corresponding to the associated second user event that will occur at the known time in a transmitting operation 406. In one embodiment, a transmitting operation 406 further comprises receiving compensation from one or more vendors for the transmitting step. In another embodiment, a method 400 may further comprise, upon an occurrence of an associated second user event, consuming at a mobile computing device information corresponding to an associated second used event that will occur at a known time. In a further embodiment, a method 400 may yet further comprise receiving compensation from one or more vendors for the consuming step. In another embodiment, a method 400 may comprise consuming information by displaying information at a mobile computing device where the information corresponds to an associated second user event that will occur at a known time. In yet a further embodiment, a method 400 may further comprise maintaining a user profile for a user of a mobile computing device. For example, a user profile may include at least one of the spatial information, temporal information, the first user event, the associated second user event, and information corresponding to an associated second user event occurring at a known time.

Figure 5:
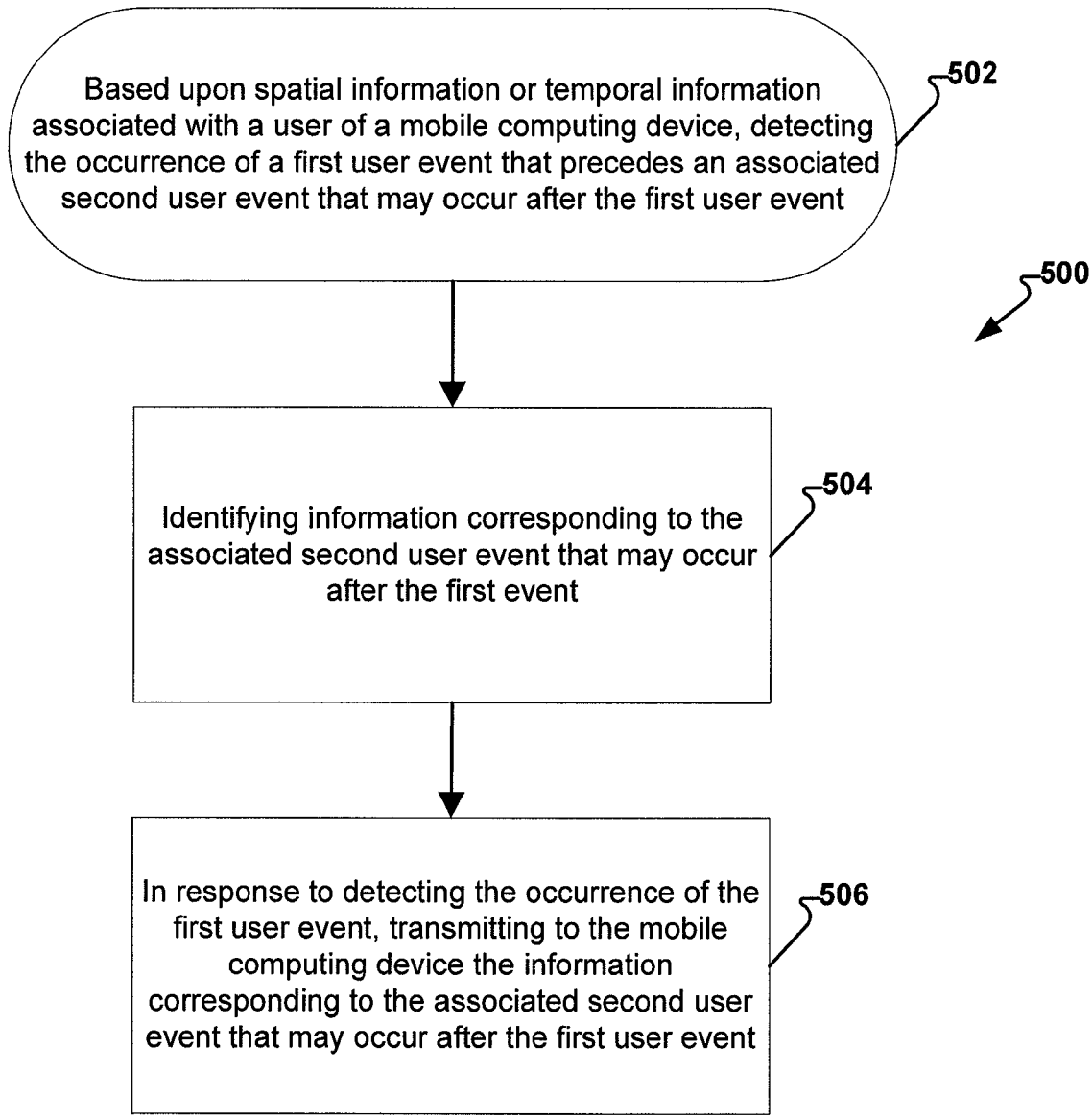
FIG. 5 is a schematic illustrating one embodiment of a method for pre-caching information on a mobile computing device.

FIG. 5 is a schematic illustrating one embodiment of a method 500 for pre-caching information on a mobile computing device. As discussed above, a method 500 may comprise, based upon spatial information or temporal information, detecting the occurrence of a first user event that precedes an associated second user event in a detecting operation 502. In one embodiment of detecting operation 502, the spatial or temporal information may be associated with a user of a mobile computing device. In one embodiment, an associated second user event in a detecting operation 502 may occur after the first user event, but may not occur at a known time. For example, a detecting operation 502 may comprise detecting a first user event as a change in the location (e.g., within a mile of a coffee shop) of a mobile computing device, whereupon a second associated event may occur such as a user visiting a second location (e.g., visiting the coffee shop). In one embodiment of method 500, information corresponding to an associated second user event that may occur after the first event is then identified in an identifying information operation 504. Following the previous example, a coupon or advertisement, or data representing the same, for the coffee shop may comprise the information identified in an identifying information operation 504. In a further embodiment of method 500, in response to detecting the occurrence of a first user event, information corresponding to an associated second user event that may occur after the first user event is transmitting to a mobile computing device in a transmitting operation 506. By way of further illustration, the coupon or advertisement, or information representing a coupon or advertisement, set forth as an example of information in an identifying information operation 504 may be transmitted to a mobile computing device in a transmitting operation 506.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, information transmitted to a mobile computing device may be assigned a transmission priority and/or consumption priority. In one embodiment, one vendor may pay to prioritize the transmission or consumption of their information with a higher priority than a priority of information corresponding to a second vendor. As another example, information corresponding to an associated second user event may comprise predicting a second user event based upon a comparison against aggregate user events. As one example, an analysis of user event data may suggest that an associated second user event (e.g., going to a pharmacy) may be likely to occur for a group of users of mobile computing devices following a certain first user event (e.g., the location of a mobile computing device at a hospital or medical facility). As yet another example, information transmitted to a user's mobile computing device and/or the user's actions or events may further result in pre-caching information on another user's mobile computing device. For example, where one user's mobile computing device heads towards or arrives at a certain location (e.g., a concert), information (e.g., information describing the concert and concert venue) may be pre-cached to other users (e.g., friends of the first user) mobile computing devices.

Numerous other changes may be made which will readily suggest themselves to those skilled in the art and which are encompassed in the spirit of the invention disclosed and as defined in the appended claims.

What is claimed is:

1. A method for pre-caching information comprising:
   detecting, by a remote computing device, the occurrence of a first user event that precedes an associated second user event, the detecting further comprising detecting a unique identifier corresponding to a user of a mobile computing device;
   determining an amount of time between the first user event and the second user event;
   identifying, by the remote computing device, information corresponding to the associated second user event;
   adjusting the information based on the amount of time; and
   in response to detecting the occurrence of the first user event, transmitting to the mobile computing device the adjusted information corresponding to the associated second user event.

2. The method of claim 1 wherein the identifying step comprises:
   identifying at least one database record associated with the unique identifier corresponding to the user of the mobile computing device, the at least one database record containing information corresponding to the associated second user event.

3. The method of claim 1 wherein the identifying step comprises:
   identifying information from one or more vendors.

4. The method of claim 3 further comprising:
   receiving compensation from the one or more vendors for the transmitting step.

5. The method of claim 3 further comprising:
   upon an occurrence of the associated second user event, consuming at the mobile computing device the adjusted information corresponding to the associated second user event.

6. The method of claim 5 further comprising:
   receiving compensation from the one or more vendors for the consuming step.

7. The method of claim 5 wherein the consuming step comprises:
   displaying at the mobile computing device the adjusted information corresponding to the associated second user event.

8. The method of claim 1 wherein the detecting step comprises:
   detecting at least an average speed or instantaneous speed.

9. The method of claim 1 wherein the detecting step comprises:
detecting at least an average velocity or instantaneous velocity.

10. The method of claim 1 wherein the detecting step comprises:
detecting a heading or direction of motion.

11. The method of claim 1 wherein the detecting step comprises:
detecting location data.

12. The method of claim 1 wherein the first user event is associated with another user of another mobile computing device.

13. The method of claim 1 wherein detecting the occurrence of a first user event further comprises:
aggregating user event information from a plurality of mobile computing device users.

14. The method of claim 1 wherein the detecting step comprises:
detecting the consumption of information corresponding to the first user event, the information corresponding to the first user event associated with the user of the mobile computing device.

15. The method of claim 1 wherein the identifying step comprises:
identifying information from a past user event corresponding to the associated second user event.

16. The method of claim 1 further comprising:
maintaining a user profile for the user of the mobile computing device.

17. The method of claim 16 wherein the user profile includes at least one of spatial information, temporal information, the first user event, the associated second user event, and the information corresponding to the associated second user event.

18. The method of claim 1 wherein the detecting step is based upon spatial information.

19. The method of claim 1 wherein the detecting step is based upon temporal information.

20. The method of claim 19 wherein the temporal information is associated with a user of the mobile computing device.

21. The method of claim 1 wherein the second user event will occur at a known time.

22. The method of claim 19 wherein the temporal information corresponds to the first user event.

23. The method of claim 18 wherein the spatial information is associated with a user of the mobile computing device.

24. The method of claim 18 wherein the spatial information associated with the user of the mobile computing device comprises at least one of global positioning system data, Bluetooth data, cellular network data, wireless network data, and wireline network data.

25. The method of claim 19 wherein the temporal data comprises a time or duration.

26. The method of claim 18 wherein the spatial information corresponds to the first user event.

27. The method of claim 26 wherein the spatial information comprises a location corresponding to the first user event or a location of the mobile computing device.

28. The method of claim 19 wherein the temporal information comprises a time corresponding to the first user event.

29. A system for delivering information prior to a user event comprising:
a user event module, in communication with a remote computing device, wherein the user event module maintains user events associated with at least one user of at least one mobile computing device;
an event information module, in communication with a remote computing device, wherein the event information module maintains information corresponding to events associated with the at least one user of the at least one mobile computing device;
a remote computing device configured to execute
a management module for detecting a first user event, determining an amount of time between the first user event and a second user event associated with the first user event, and identifying information corresponding to the second user event, the detecting further comprising detecting a unique identifier corresponding to the at least one user of the at least one mobile computing device; and
a communications module for adjusting the information based on the amount of time and for transmitting, prior to occurrence of the second user event, the adjusted information corresponding to the second user event to the at least one mobile computing device in communication with the remote computing device via a communications network.

30. The system of claim 29 wherein the information corresponding to the second user event comprises information maintained by at least one vendor information module in communication with the remote computing device.

* * * * *